United States Patent
Zhu et al.

(10) Patent No.: US 8,699,419 B2
(45) Date of Patent: *Apr. 15, 2014

(54) METHOD, SYSTEM AND APPARATUS FOR PROVIDING ACCESS MODE SELECTION TO MULTIMODE TERMINAL

(75) Inventors: Dongming Zhu, Shenzhen (CN); Jie Xu, Beijing (CN); Li Wen, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

This patent is subject to a terminal disclaimer.

(21) Appl. No.: 13/270,935

(22) Filed: Oct. 11, 2011

(65) Prior Publication Data

US 2012/0026946 A1  Feb. 2, 2012

Related U.S. Application Data

(63) Continuation of application No. 12/419,797, filed on Apr. 7, 2009, which is a continuation of application No. PCT/CN2007/002929, filed on Oct. 11, 2007.

(30) Foreign Application Priority Data

Oct. 12, 2006 (CN) .......................... 2006 1 0141098
Apr. 18, 2007 (CN) .......................... 2007 1 0093787

(51) Int. Cl.
*H04W 4/00* (2009.01)

(52) U.S. Cl.
USPC .......................... 370/328; 455/435.2; 455/445

(58) Field of Classification Search
USPC ............ 370/328, 331, 338; 455/456.1, 432.1; 709/227

See application file for complete search history.

(56) References Cited

U.S. PATENT DOCUMENTS 6,914,913 B2  7/2005 Sheynman et al.
2006/0003800 A1  1/2006 Sheynman et al.

(Continued)

FOREIGN PATENT DOCUMENTS

CN  1561119 A  1/2005
CN  1685635 A  10/2005

(Continued)

OTHER PUBLICATIONS $2^{nd}$ Office Action in corresponding Chinese Application No. 200710093787.0 (Jul. 20, 2011).

(Continued)

*Primary Examiner* — Kevin C Harper
*Assistant Examiner* — Henry Baron
(74) *Attorney, Agent, or Firm* — Leydig, Voit & Mayer, Ltd.

(57) ABSTRACT

A method, system and apparatus for providing access mode selection to multimode terminal are disclosed. After selecting an access mode according to a certain policy, a routing decision entity correspondingly instructs a routing execution entity to perform a call connection in the selected access mode. The method for providing access mode selection to multimode terminal includes the following steps: (1) when establishing a registration connection, a terminal notifies related information of a current access network type to a network side; and (2) when performing a call connection to a called party, a routing decision entity on the network side selects the access mode and correspondingly instructs a routing execution entity to perform the call connection according to the related information and the selected access mode.

3 Claims, 11 Drawing Sheets

(56) References Cited

U.S. PATENT DOCUMENTS

| | | | |
|---|---|---|---|
| 2006/0009187 A1 | 1/2006 | Sheynman et al. | |
| 2006/0209805 A1 | 9/2006 | Mahdi et al. | |
| 2006/0286980 A1* | 12/2006 | Hua | 455/435.1 |
| 2007/0043872 A1* | 2/2007 | Pattan et al. | 709/227 |
| 2008/0064393 A1* | 3/2008 | Oommen et al. | 455/432.1 |
| 2008/0298351 A1 | 12/2008 | Buckley et al. | |
| 2009/0222525 A1* | 9/2009 | Jayawant Pattan | 709/206 |

FOREIGN PATENT DOCUMENTS

| | | | |
|---|---|---|---|
| CN | 1741658 A | | 3/2006 |
| CN | 1750698 A | | 3/2006 |
| CN | 101163291 B | | 9/2010 |
| WO | WO 2005/117463 A2 | | 12/2005 |
| WO | WO 2006/105223 A1 | | 10/2006 |
| WO | WO 2006105223 A1 | * | 10/2006 |

OTHER PUBLICATIONS

1st Office Action in corresponding European Application No. 07816543.8 (Sep. 2, 2011).
Corresponding U.S. Appl. No. 12/419,797 (Sep. 29, 2011).
Written Opinion of the International Searching Authority in corresponding PCT Application No. PCT/CN2007/002929 (Jan. 24, 2008).
International Search Report in corresponding PCT Application No. PCT/CN2007/002929 (Jan. 24, 2008).
1st Office Action in corresponding Chinese Application No. 200610141098.8 (Jul. 17, 2009).
European Search Report in corresponding European Application No. 07816543.8 (Oct. 5, 2010).
3GPP TS 23.206, "Technical Specification Group Services and System Aspects; Voice Call Continuity between CS and IMS; Stage 2 (Release 7)," Sep. 2006, Version 2.0.0, 3rd Generation Partnership Project, France.
3GPP TS 23.228, "Technical Specification Group Services and System Aspects; IP Multimedia Subsystem (IMS); Stage 2 (Release 7)," Sep. 2006, Version 7.5.0, $3^{rd}$ Generation Partnership Project, France.
3GPP TS 24.229, "Technical Specification Group Core Network and Terminals; IP multimedia call control protocol based on Session Initiation Protocol (SIP) and Session Description Protocol (SDP); Stage 3 (Release 7)," Oct. 2006, Version 7.5.1, $3^{rd}$ Generation Partnership Project, France.
Rosenberg et al., "RFC384—Caller Preferences for the Session Initiation Protocol (SIP)," Aug. 2004, The Internet Society, Reston, Virginia.
Rosenberg et al., "RFC3840—Indicating User Agent Capabilities in the Session Initiation Protocol (SIP)," Aug. 2004, The Internet Society, Reston Virginia.
Rosenberg, "Obtaining and Using Globally Routable User Agent (UA) URIs (GRUU) in the Session Initiation Protocol (SIP) Draft," Mar. 5, 2007, The Internet Engineering Task Force, Fremont, California.
Jennings et al., "Managing Client Initiated Connections in the Session Initiation Protocol (SIP) Draft," Jun. 25, 2006, The Internet Society, Reston, Virginia.
Jennings et al., "Managing Client Initiated Connections in the Session Initiation Protocol (SIP) Draft," Nov. 22, 2006, The Internet Society, Reston Virginia.
USPTO, 1st Office Action in corresponding U.S. Appl. No. 12/419,797 (May 22, 2012).
Final Office Action in corresponding U.S. Appl. No. 12/419,797 (Nov. 7, 2012).

* cited by examiner

US 8,699,419 B2

METHOD, SYSTEM AND APPARATUS FOR PROVIDING ACCESS MODE SELECTION TO MULTIMODE TERMINAL

CROSS-REFERENCE TO RELATED APPLICATIONS

This application is a continuation of U.S. patent application Ser. No. 12/419,797, filed Apr. 7, 2009, which is a continuation of International Patent Application No. PCT/CN2007/002929, filed Oct. 11, 2007. The International Patent Application claims priority to Chinese Patent Application No. 200610141098.8, filed on Oct. 12, 2006, and Chinese Patent Application No. 200710093787.0, filed Apr. 18, 2007. The afore-mentioned patent applications are hereby incorporated by reference in their entirety.

FIELD OF THE INVENTION

The present invention relates to a communication field, and more particularly to a method, a system, and an apparatus for providing access mode selection to multimode terminal.

BACKGROUND

IP multimedia sub-system (IMS) is the IP multimedia sub-system in wideband code division multiple access (WCDMA) network defined by the $3^{rd}$ generation partner project (3GPP) R5/R6 standard, and is a target network implementing packet voice and packet data of the 3G mobile network and providing unified multimedia service and application. The IMS adopts the IP packet domain as a bearing channel for controlling messages and media transmission, and adopts the session initiation protocol (SIP) as the call controlling message. In the IMS, the user subscription data of the IMS is gathered and managed in a home subscriber server (HSS), the service is uniformly provided by an application server (AS), and the session control is achieved by a serving-call session control function (S-CSCF), and the HSS, the AS and the S-CSCF are completely separated in the network structure. The service is triggered to the AS via the S-CSCF, and a plurality of ASs may cooperate with one another. The user gets access to the IMS via the current local agent node—proxy-call session control function (P-CSCF), the session and the service control are achieved by a home domain service node of the registration location, so that the user may obtain the same service at different access points so as to separate the service management, the session control and the bearing access, and to provide services not related to the access and the location.

As a terminal supporting multi-access mode comes forth, the multimode terminal of the user may register on the network via a plurality of access domains, and user identities registering at the same time may be the same or have a certain association (for the identities without the association, the process is the same as that of the single-mode terminal). Here, the referred multimode terminal includes, but not limited to, the multimode terminal of the WCDMA, the multimode terminal of the CDMA2000, or the mobile multimode terminal of other standards. The user may initiate or receive the call at any registration domain, or even may initiate or receive the call simultaneously at a plurality of domains.

It is a topic being researched by the 3GPP that which access network is selected by the network to be connected to the call when the multimode terminal serves as a called party. Recently, the solution proposed by the 3GPP is that an entity called as a domain selection function (DSF) is added into the IMS network. When receiving the call required to be connected to the multimode terminal, the DSF entity makes an access domain selection decision according to various factors such as the operator policy, the user preference, the terminal registration status and various elements, and connects the call to the selected access domain according to a decision result. When the DSF selects to perform the call connection in a circuit switched (CS) domain, the DSF returns a CS domain access number to the S-CSCF so as to instruct the call to be connected to the CS domain. When the DSF selects to perform the call connection in the IMS domain, the DSF returns an IMS public user identity (IMPU) of the user to the S-CSCF so as to instruct the call to be connected at the IMS domain.

During the invention process, the inventor finds that a plurality of access modes exists under a certain access domain, but in existing systems, the problem of performing the access mode selection and the call connection instruction by the network when the multimode terminal serves as the called party cannot be solved. That is, after selecting the access mode according to a certain policy, the routing decision entity cannot correspondingly instruct a routing execution entity to perform the call connection in the selected access mode.

SUMMARY

The present invention is directed to a method, a system, and an apparatus for providing access mode selection to multimode terminal, so that after selecting an access mode according to a certain policy, a routing decision entity can instruct correspondingly a routing execution entity to perform a call connection in the selected access mode.

The present invention provides a method for providing access mode selection to multimode terminal, which includes the following steps: (1) when establishing a registration connection, a terminal notifies related information of a current access network type to a network side; and (2) when performing the call connection to a called party, a routing decision entity on the network side selects the access mode and correspondingly instructs a routing execution entity to perform a call connection according to the related information and the selected access mode.

The present invention provides a system for providing access mode selection to multimode terminal, which includes: a multimode terminal, adapted to notify related information of a current access network type to a network side when establishing a registration connection; a routing decision entity, adapted to select the access mode and correspondingly transmit a corresponding instruction according to the related information and the selected access mode when performing the call connection to a called party; and a routing execution entity, adapted to perform the call connection according to the received instruction.

The present invention provides a routing decision entity, which includes: a saving unit, adapted to save an access network type identity carried in a registration signaling; and an instructing unit, adapted to extract the corresponding access network type identity from the saving unit, after the routing decision entity selects an access mode according to a policy, and carry the extracted access network type identity in an instruction signaling delivered to a routing execution entity.

The present invention provides a multimode terminal, which includes: an access network identifying unit, adapted to identify an adopted access network when a multimode terminal gets access to network; and an adding unit, adapted to add a corresponding access network type identity to a registration signaling transmitted to a network side according to the current access network of the multimode terminal identified by the access network identifying unit, when the multimode terminal initiates to register.

The present invention further provides a routing decision entity, which includes: an associating unit, adapted to associate an access mode type notified by a multimode terminal with a globally routable user agent (UA) uniform resource identifier (URI) (GRUU) distributed by a routing execution entity; an access mode selection unit, adapted to select the access mode; and an instructing unit, adapted to acquire the GRUU corresponding to the access mode type selected by the access mode selection unit from the associating unit, and instruct the routing execution entity to perform a call connection with the GRUU.

The present invention further provides a multimode terminal, which includes: an identifying unit, adapted to identify an access mode type of the multimode terminal when establishing a registration connection; and an adding unit, adapted to add the current access mode type of the multimode terminal identified by the identifying unit and a resource name bound with the current access mode type to a registration message transmitted to a network side.

The present invention further provides a routing decision entity, which includes: a saving unit, adapted to save identification information of a current access network type notified by a terminal when establishing a registration connection; a dividing unit, adapted to divide a calling session message into media streams according to media components and transmit a divided result; an access mode selection unit, adapted to respectively select an access mode corresponding to each media stream according to the divided result transmitted from the dividing unit; and an instructing unit, adapted to respectively acquire the identification information corresponding to an access mode type selected by the access mode selection unit for each media stream from the saving unit, and instruct a routing execution entity to perform the media stream connection with the identification information.

With the method for providing access mode selection to multimode terminal, the system, and the apparatus according to the present invention, when establishing the registration connection, the terminal notifies the related information of the current access network type to the network side. In this manner, when performing the call connection to the called party, the routing decision entity on the network side selects the access mode and correspondingly instructs the routing execution entity to perform the call connection according to the related information and the selected access mode.

DETAILED DESCRIPTION

After selecting an access mode according to a certain policy, a routing decision entity correspondingly instructs a routing execution entity to perform a call connection in the selected access mode.

Figure 1:
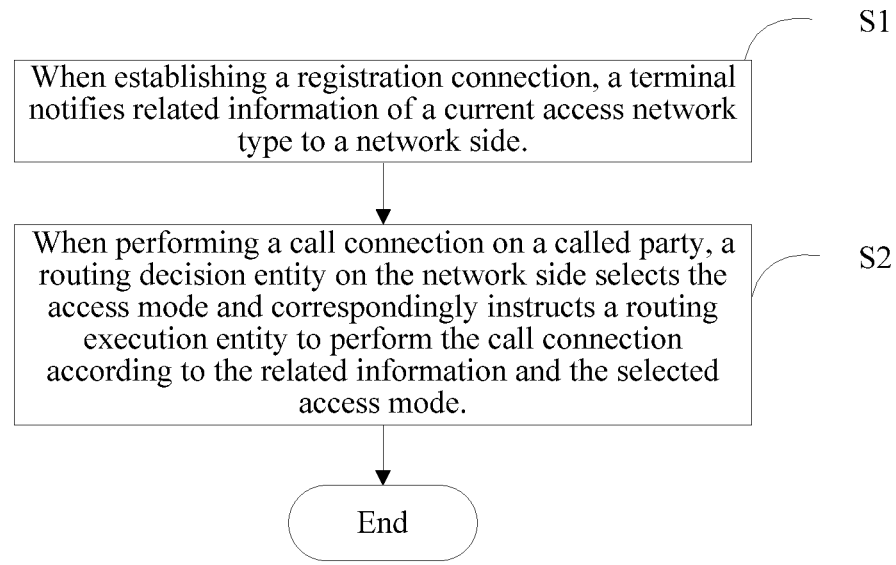
FIG. 1 is a flow chart of steps of a method according to an embodiment of the present invention.

The present invention provides a method for providing access mode selection to multimode terminal, referring to FIG. 1, the method mainly includes the steps as follows.

In Step S1, when establishing a registration connection, a terminal notifies related information of a current access network type to a network side.

In Step S2, when performing a call connection to a called party, a routing decision entity on the network side selects the access mode and correspondingly instructs a routing execution entity to perform the call connection according to the related information and the selected access mode.

The present invention further provides a system for providing access mode selection to multimode terminal, which includes a multimode terminal, a routing decision entity, and a routing execution entity. The multimode terminal is adapted to notify related information of a current access network type to a network side when establishing a registration connection. The routing decision entity is adapted to select the access mode and correspondingly transmit a corresponding instruction according to the related information and the selected access mode when performing the call connection to a called party. The routing execution entity is adapted to perform the call connection according to the received instruction.

The method and the system according to the embodiments of the present invention are described in detail as follows.

Figure 2:
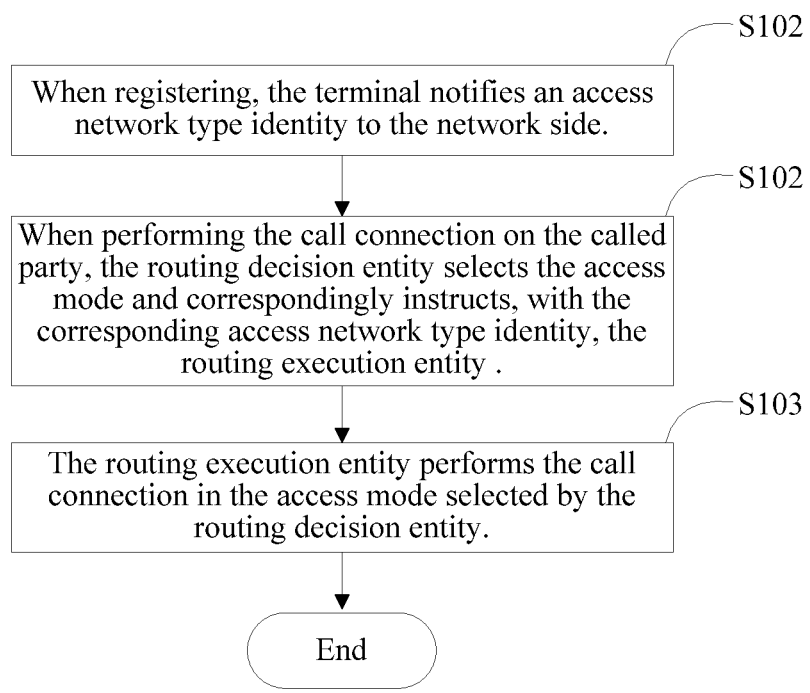
FIG. 2 is a flow chart of steps of a method according to a first embodiment of the present invention.

In order to achieve that when the multimode terminal serves as a called party, after selecting the access mode, the routing decision entity correspondingly instructs the routing execution entity to perform the call connection in the selected access mode, that is, the multimode terminal may get access to an IMS domain via different access networks at the same time, when the user serves as the called party, the network may select a certain access network to perform the call connection according to a policy, and when the user has a plurality of terminals sharing the IMPU on the access network, a forking operation of the network is not affected. Referring to FIG. 2, the method according to a first embodiment of the present invention includes the main steps as follows.

In Step S101, when registering, the terminal notifies an access network type identity to the network side.

In a reg-id solution, that is, when the user has only one terminal using a certain IMPU, the network identifies a certain contact address by expanding a usage scope of the reg-id to enable the reg-id to occur in the call signaling, or designates one of the access types of the multimode terminal by directly designating one contact address. However, when the user has a plurality of terminals sharing the IMPU, and a plurality of terminals sharing the IMPU under the same access network registers on the IMS network, the DSF can only select one access network type instead of a certain specific contact address, but the reg-id cannot be adapted to identify the different access network types, so under the situation of selecting one access network, the DSF cannot instruct the selected access network type to the S-CSCF with the reg-id to enable the S-CSCF to perform the forking operation on the plurality of terminals registering on the access network. In the present invention, an identity capable of instructing the access network type is added in the reg-id solution.

In the present invention, when registering, the terminal carries an access network type identity corresponding to the current access mode in a registration signaling, so that the routing decision entity on the network side (may be, but not limited to, the DSF, or another AS) and the routing execution entity (may be the S-CSCF) respectively acquire and save the access network type identity.

The manner of carrying the access network type identity in the registration signaling includes, but not limited to, the three types as follows:

In a first manner, a parameter is added after a contact header field so as to carry the access network type identity.

The access network type identity may be a new feature tag type, adapted to identify the access network type corresponding to one specific contact address. For example, a parameter accesstype="wlan" is added after the contact header field to identify that the registration of this time is performed via a wireless local area network (WLAN) access network. The parameter, together with other feature tags, is acquired by the S-CSCF and the DSF during registration.

In a second manner, a parameter is added after the IMPU so as to carry the access network type identity.

For the access network type identity, a parameter is added after the IMPU to represent the access network type, for example, a parameter accesstype="wlan" is added after the IMPU zhangsan@public.id to identify the WLAN access network. The parameter, together with the IMPU, is acquired by the S-CSCF and the DSF during registration of the user.

In a third manner, a prefix or suffix is added to the IMPU so as to carry the access network type identity.

The access network type identity may serve as the suffix or prefix of the IMPU, that is, the IMPU is expanded by adopting the suffix or prefix, and the access network type is identified in the suffix or prefix. For example, the IMPU is originally zhangsan@public.id, when the terminal gets access via the WLAN, the IMPU is expanded to zhangsan_wlan@public.id, and when the terminal gets access via the WCDM, the IMPU is expanded to zhangsan_utran@public.id. If the user has a plurality of terminals capable of getting access to the IMS network via the WLAN, the terminals expand the IMPU of the terminals to zhangsan_wlan@public.id when registering.

In Step S102, when performing the call connection to the called party, the routing decision entity selects the access mode and correspondingly instructs, with the corresponding access network type identity, the routing execution entity.

When the user serves as the called party, after selecting one access network type according to various policies, the routing decision entity (may be the DSF) notifies the selected result to the routing execution entity (may be the S-CSCF) by carrying the corresponding access network type identity in a call signaling returned to the S-CSCF.

The manners of carrying the corresponding access network type identity in the call signaling correspond to the three manners in Step S1.

Corresponding to the first manner in Step S101, when performing the connection to the called party, after selecting one access network, the DSF notifies the selected access network type to the S-CSCF with a calling party preference mechanism, adds an Accept-contact header field to a session request message transmitted to the S-CSCF. The header field instructs to use the certain specific access network type to perform the call connection, for example, for Accept-Contact: *;accesstype="wlan", the format represents that the network should select the registration connection with the access network type being WLAN to perform the call connection.

Corresponding to the second manner in Step S101, when performing the connection to the called party, after selecting one access network, the DSF carries the newly added parameter behind the called party identity (IMPU) so as to notify the selected result to the S-CSCF. As compared with the first manner, the advantage of this manner is that the routing is directly performed with the called party identity instead of the calling party preference mechanism, and the disadvantage is that the SIP parameter should be additionally added.

Corresponding to the third manner in Step S101, when the received called party identity is an original IMPU call, the DSF selects one access network, and then fills the called party identity as the expanded IMPU with the added corresponding suffix or prefix in the call signaling transmitted to the S-CSCF. In this manner, the S-CSCF may acquire the selected result of the DSF, and searches for the registration connection performed with the expanded IMPU. As compared with the second manner, the advantage of this manner is that it is not necessary to expand the parameter, and the routing is directly performed with the IMPU, and the disadvantage is that other ASs not required acquiring the different access network types of the terminal need to identify the IMPU.

In Step S103, the routing execution entity performs the call connection in the access mode selected by the routing decision entity.

After acquiring the access network type identity carried in the call signaling, the S-CSCF may search for which terminals of the user getting access to the IMS domain under the access network (that is, which terminals registering under the access network). If only one terminal is found, the S-CSCF directly performs the call connection on the terminal, and if a plurality of terminals is found, the S-CSCF may perform the forking operation according to other policies.

Further, in order to solve the problem that the same terminal holds a plurality of registration connections at the IMS network, and the problem that after selecting the access mode, the routing decision entity cannot correspondingly instruct the routing execution entity to perform the call connection in the selected access mode, in the method according to the embodiment of the present invention, when the terminal registers, the network side identifies a plurality of registration events of the same terminal according to the acquired access network type identity so as to hold the plurality of registration connections of the same terminal, so that the reg-id solution is not required.

The specific method is described as follow. When receiving the registration signaling transmitted from the same terminal, the S-CSCF may differentiate the registration signaling according to the access network type identities carried in the registration signaling. If the access network types of two registrations are the same, the original registration connection may be deregistered. If the access network types of two registrations are different, it may be considered that a multiple registration event exists, and the original registration connection is not deregistered.

If the terminal needs to only register the latest access after changing the access network, and the original access is not reserved, the terminal may initiate the deregistration to the original registration. If the terminal loses the original access network connection, and cannot initiate the deregistration to the original registration, the network may judge whether to deregister the original connection according to the two continuous access network types. If the two continuous access networks cannot coexist, for example, long term evolution (LTE) and global system for mobile communication radio access network (GERAN), the network may deregister the original registration connection. Alternatively, the network may also not actively judge the access network type, but waits for timeout of the registration connection, and deregisters the original registration connection.

The method of the present invention is further described in detail with three embodiments as follows.

Figure 3:
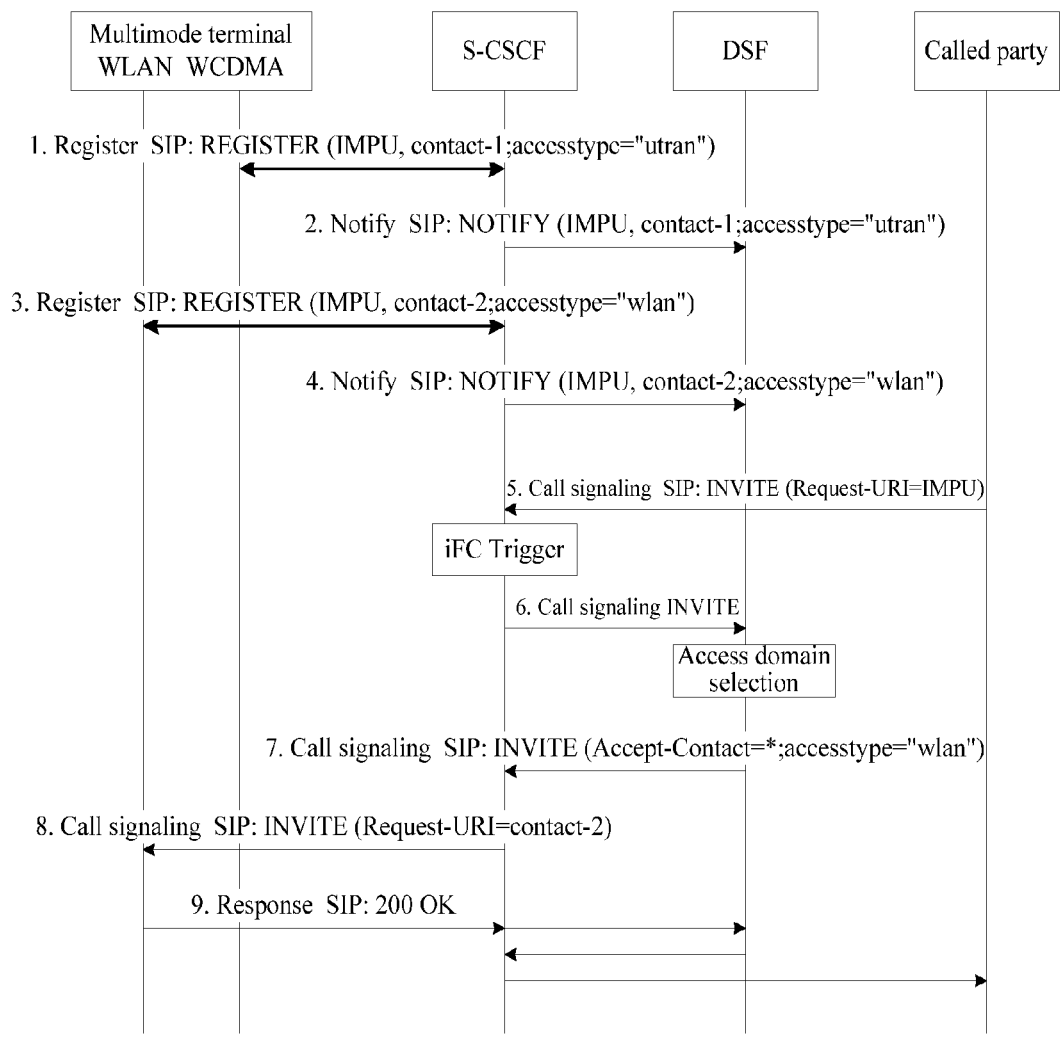
FIG. 3 is a flow chart of signaling of a method according to a second embodiment of the present invention.

In the method according to a second embodiment, one feature tag is added to identify the access network type. It is assumed that the name of the added feature tag is accesstype, with specific values including "wlan", "lte", "utran", "geran", and "hrpd" etc., for identifying various different access network types. Referring to FIG. 3, the method includes the specific steps as follows.

In Step 1, the multimode terminal gets access to the IMS network via the WCDMA and initiates a registration request REGISTER, a contact-1 address is carried in the request message, the accesstype parameter identifying the access network type is carried behind the contact header field, and the value of the parameter is "utran", representing that the multimode terminal gets access to the IMS network via the WCDMA network. After being forwarded through other entities, the request message reaches the S-CSCF, and the process thereof is irrelevant to the present invention, so it is omitted here.

In Step 2, after the user finishes the registration process, the S-CSCF notifies the user registration event and the contact content to the DSF (the DSF has subscribed the user registration event from the S-CSCF before, so here the S-CSCF may notify the DSF, and the subscription process is irrelevant to the present invention, so it is omitted here).

In Step 3, the multimode terminal gets access to the IMS network from the WLAN and initiates another registration request. The new contact address and the accesstype parameter with the value being "wlan" are carried in the request message, representing that the multimode terminal gets access to the IMS network from the WLAN network again. After receiving the registration message, the S-CSCF judges that this is a multiple registration initiated by the same terminal according to the different access network type parameters, and the original contact-1 connection is not deregistered. The S-CSCF acquires that this is a multiple registration event initiated by the same terminal in other manners, for example, the reg-id according to a first technical solution in the existing systems described herein.

In Step 4, the S-CSCF also notifies the new registration event of the user to the DSF.

In Step 5, when one call is required to be connected to the user, the call signaling INVITE is firstly transmitted to the S-CSCF.

In Step 6, the S-CSCF triggers the call signaling to the DSF with initial filter criteria (iFC).

In Step 7, when deciding that it is necessary to be connected to the call from the WLAN according to various policies, the DSF fills the content of the Accept-contact header field content with accesstype="wlan", and returns the INVITE request with the header field to the S-CSCF.

In Step 8, according to the selection of the DSF, the S-CSCF selects the registration connection with the accesstype being "wlan." In this embodiment, it is assumed that only one registration connection, that is, contact-2, exists, the S-CSCF fills the Request-URI with the content of the contact-2, and then delivers the INVITE request. In this manner, the call is connected with the WLAN access network. If a plurality of registration connections with the accesstype being "wlan" exists, the S-CSCF may deliver the call request to the connections at the same time or in sequence, and performs the forking operation.

In Step 9, the multimode terminal receives the call under the WLAN and returns the call final response.

Figure 4:
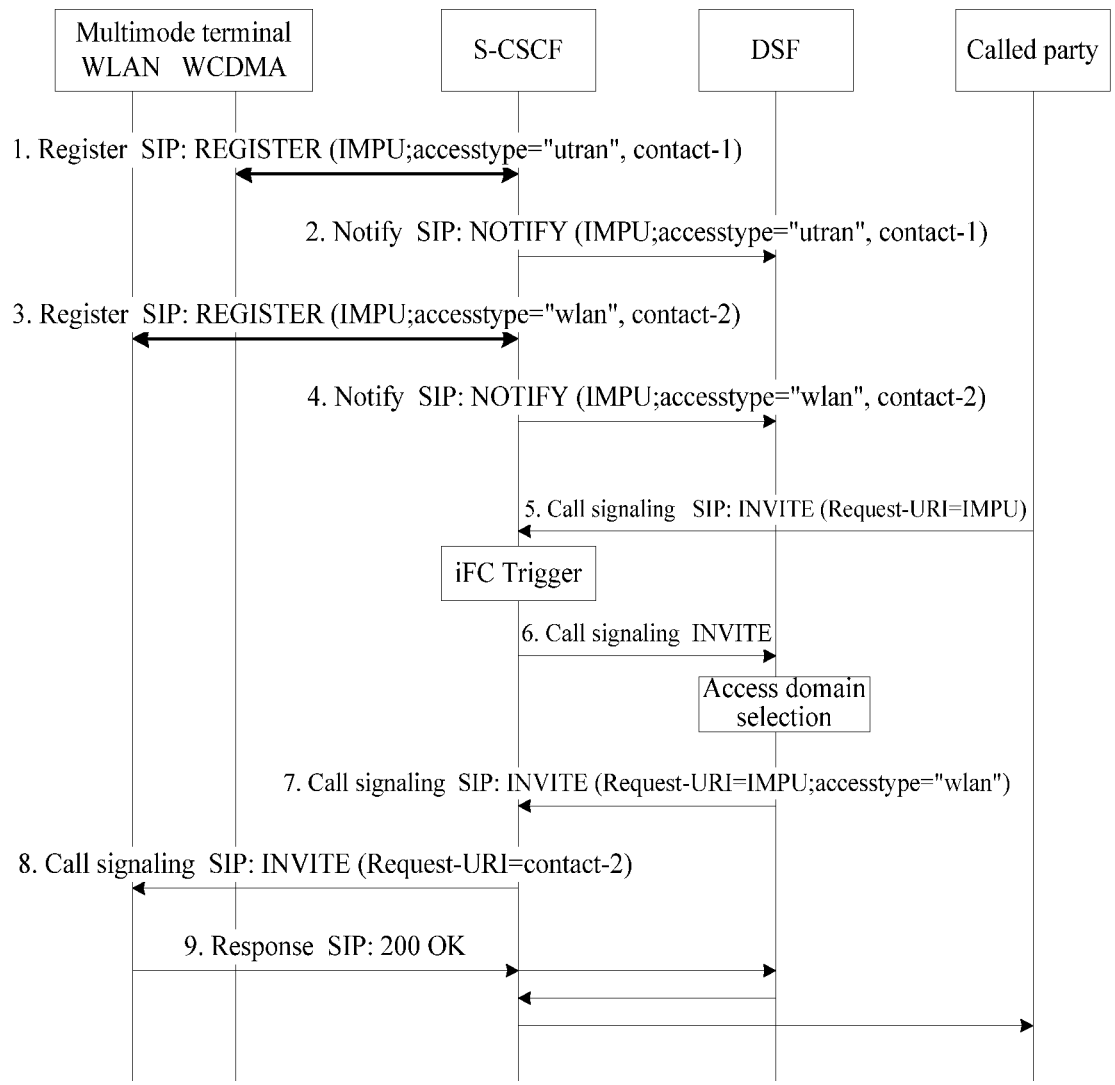
FIG. 4 is a flow chart of signaling of a method according to a third embodiment of the present invention.

In the method according to a third embodiment, the parameter is added behind the IMPU to identify the different access network types. The name of the added parameter is accesstype, with specific values including "wlan", "lte", "utran", "geran", and "hrpd" etc., for identifying various different access network types. Referring to FIG. 4, the method includes the specific steps as follows.

In Step 1, the multimode terminal gets access to the IMS network via the WCDMA and initiates a registration request REGISTER, a contact-1 address is carried in the request message, the accesstype parameter identifying the access network type is carried behind the IMPU carried in the TO header field, and the value of the parameter is "utran", representing that the multimode terminal gets access to the IMS network via the WCDMA network. After being forwarded through other entities, the request message reaches the S-CSCF, and the process is irrelevant to the present invention, so it is omitted here.

In Step 2, after the user finishes the registration process, the S-CSCF notifies the user registration event, the registration user identity IMPU, and the contact content to the DSF (the DSF has subscribed the user registration event from the S-CSCF before, so here the S-CSCF may notify the DSF, and the subscription process is irrelevant to the present invention, so it is omitted here).

In Step 3, the multimode terminal gets access to the IMS network via the WLAN and initiates another registration request. The new contact address and the accesstype parameter with the value being "wlan" behind the IMPU in the TO header field are carried in the request message, representing that the multimode terminal gets access to the IMS network from the WLAN network again. After receiving the registration message, the S-CSCF judges that this is a multiple registration initiated by the same terminal according to the different access network type parameters, and the original contact-1 connection is not deregistered. The S-CSCF acquires that this is the multiple registration event initiated by the same terminal with other manners, for example, the reg-id according to a first technical solution in the existing systems described herein.

In Step 4, the S-CSCF also notifies the new registration event of the user to the DSF.

In Step 5, when one call is required to be connected to the user, the call signaling INVITE is firstly transmitted to the S-CSCF.

In Step 6, the S-CSCF triggers the call signaling to the DSF via an iFC.

In Step 7, when deciding that it is necessary to be connected to the call from the WLAN according to various policies, the DSF fills the content of the Request-URI header field content with accesstype="wlan" to represent the selected result, and returns the INVITE request to the S-CSCF.

In Step 8, according to the selection of the DSF, the S-CSCF selects the registration connection performed with the IMPU with accesstype being "wlan." In this embodiment, it is assumed that only one registration connection, that is, contact-2, exists, the S-CSCF fills the Request-URI with the content of the contact-2, and then delivers the INVITE request. In this manner, the call is connected with the WLAN access network. If a plurality of registration connections performed with the IMPU with the accesstype parameter being "wlan" exists, the S-CSCF may deliver the call request to the connections at the same time or in sequence, and performs the forking operation.

In Step 9, the multimode terminal receives the call under the WLAN and returns the call final response.

Figure 5:
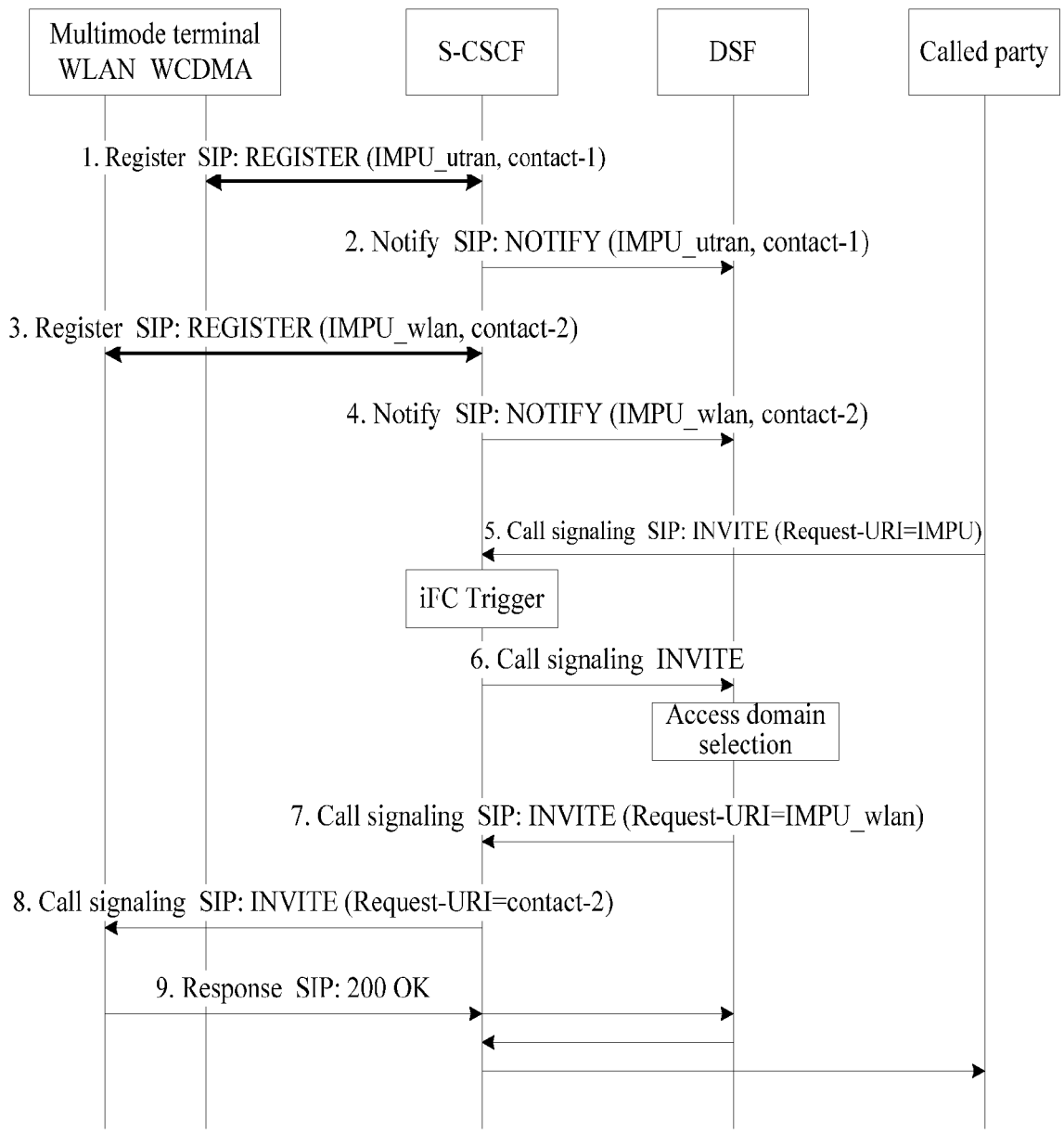
FIG. 5 is a flow chart of signaling of a method according to a fourth embodiment of the present invention.

In the method according to a fourth embodiment, the IMPU is expanded, and the suffix is added behind the IMPU to identify the different access network types. Referring to FIG. 5, the method includes the specific steps as follows:

In Step 1, the multimode terminal gets access to the IMS network via the WCDMA and initiates a registration request REGISTER, a contact-1 address is carried in the request message, and a suffix_utran identifying the access network type is carried behind the IMPU carried in the TO header field, representing that the multimode terminal gets access to the IMS network from the WCDMA network. After being forwarded with other entities, the request message reaches the S-CSCF, and the process is irrelevant to the present invention, so it is omitted here.

In Step 2, after the user finishes the registration process, the S-CSCF notifies the user registration event, the registration user identity IMPU, and the contact content to the DSF (the DSF has subscribed the user registration event from the S-CSCF before, so here the S-CSCF may notify the DSF, and the subscription process is irrelevant to the present invention, so it is omitted here).

In Step 3, the multimode terminal gets access to the IMS network from the WLAN and initiates another registration request, the new contact address and the suffix_utran after the IMPU carried in the TO header field are carried in the request message, representing that the multimode terminal gets access to the IMS network from the WLAN network again. After receiving the registration message, the S-CSCF judges that this is a multiple registration initiated by the same terminal according to the different access network type parameters, and the original contact-1 connection is not deregistered. The S-CSCF acquires that this is the multiple registration event initiated by the same terminal with other manners, for example, the reg-id described in the existing systems.

In Step 4, the S-CSCF also notifies the new registration event of the user to the DSF.

In Step 5, when one call is required to be connected to the user, the call signaling INVITE is firstly transmitted to the S-CSCF.

In Step 6, the S-CSCF triggers the call signaling to the DSF with an iFC.

In Step 7, when deciding that it is necessary to be connected to the call from the WLAN according to various policies, the DSF modifies the Request-URI requested by the INVITE to the expanded IMPU with the added suffix: IMPU_wlan to represent the selected result, and returns the INVITE request to the S-CSCF.

In Step 8, according to the selection of the DSF, the S-CSCF selects the registration connection with the IMPU being the IMPU_wlan. In this embodiment, it is assumed that only one registration connection, that is, contact-2, exists, the S-CSCF fills the Request-URI with the content of the contact-2, and then delivers the INVITE request. In this manner, the call is connected with the WLAN access network. If a plurality of registration connections performed with the IMPU_wlan, the S-CSCF may deliver the call request to the connections at the same time or in sequence, and performs the forking operation.

In Step 9, the multimode terminal receives the call under the WLAN and returns the call final response.

Figure 6:
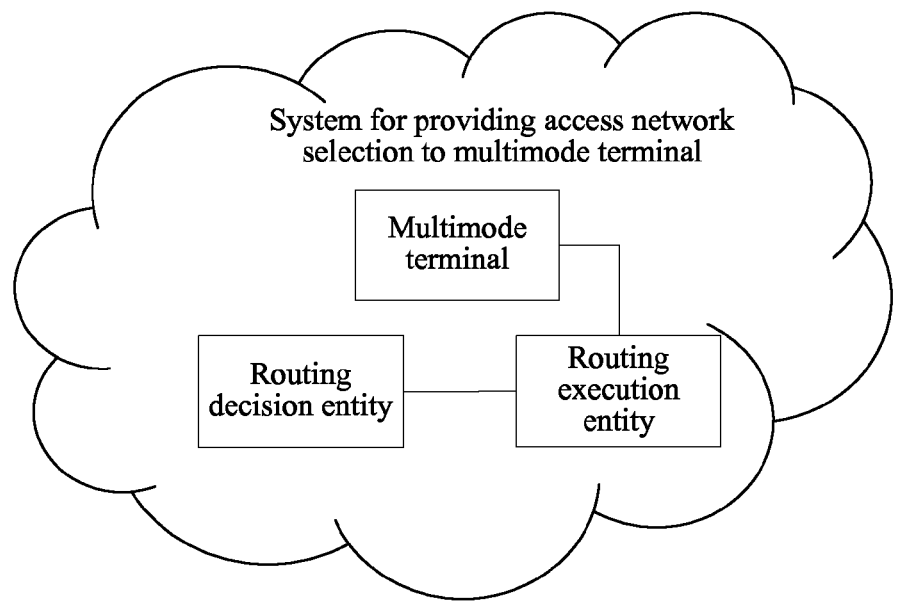
FIG. 6 is a schematic structural view of a system according to a first embodiment of the present invention.

Referring to FIG. 6, the system according to a first embodiment of the present invention includes a routing decision entity (may be, but not limited to, the DSF, or another AS), a routing execution entity (may be the S-CSCF), and a multimode terminal (may be the multimode terminal of the WCDMA, the multimode terminal of the CDMA2000, or other mobile multimode terminals of other standards) connected in sequence.

The multimode terminal is adapted to notify an access network type identity corresponding to the current access mode to a network side with a registration signaling when registering.

The routing decision entity is adapted to select the access mode according to various policies, and instruct the routing execution entity to perform the call connection to a called party in the selection access mode with the corresponding access network type identity.

The routing execution entity is adapted to perform the call connection according to the instruction of the routing decision entity.

Figure 7:
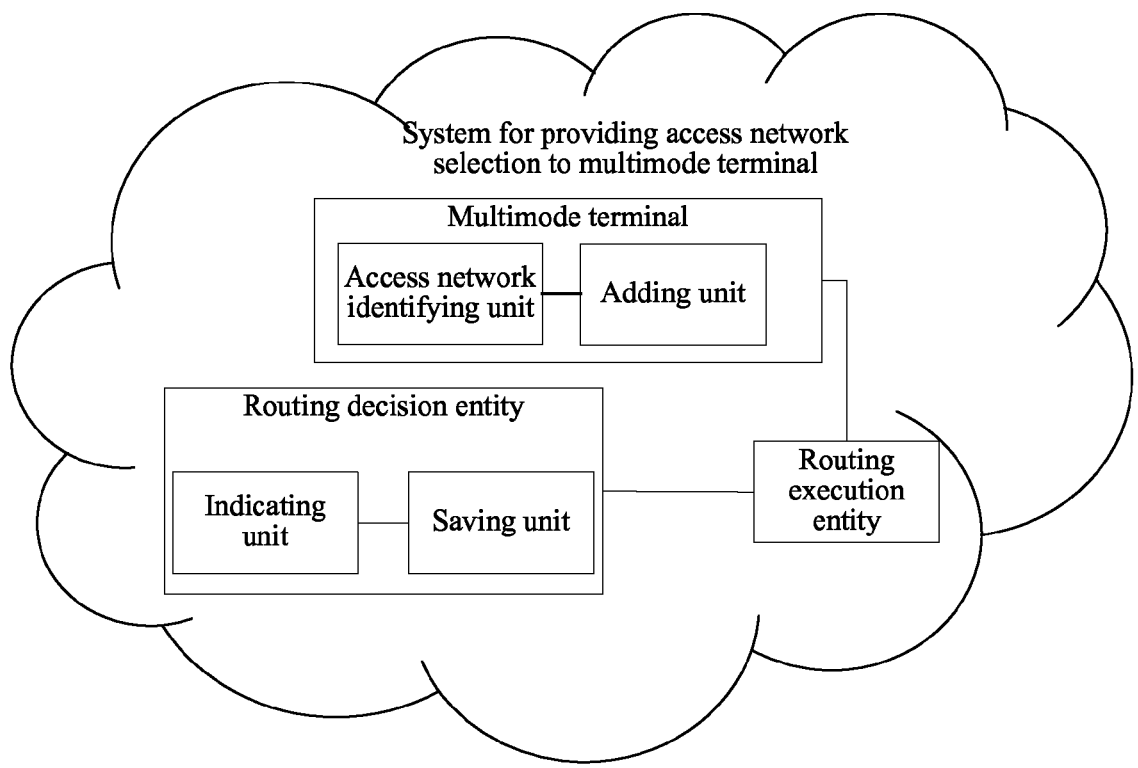
FIG. 7 is a schematic modular view of the system according to the first embodiment of the present invention.

Referring to FIG. 7, the multimode terminal (that is, the multimode terminal of the present invention) includes an access network identifying unit and an adding unit connected with each other. The access network identifying unit is adapted to identify an adopted access network when the multimode terminal gets access to network. The adding unit is adapted to add the corresponding access network type identity to the registration signaling transmitted to the network side according to the current access network of the multimode terminal identified by the access network identifying unit, when the multimode terminal initiates to register.

The routing decision entity (that is, the routing decision entity of the present invention) includes a saving unit and an instructing unit connected to each other. The saving unit is adapted to save the access network type identity carried in the registration signaling (after acquiring the access network type identity, the routing execution entity transmits the access network type identity to the routing decision entity), and provide the access network type identity to the instructing unit. The instructing unit is adapted to extract the corresponding access network type identity from the saving unit, after the routing decision entity selects the access mode according to the policy, and carry the extracted access network type identity in an instruction signaling delivered to the routing execution entity.

To sum up, in the present invention, the reg-id is not adopted, and numerals such as 1 and 2 do not serve as the value of the reg-id, but the access network type identity is adapted to represent the access mode of the terminal. When registering, the terminal notifies the access network type identity to the network side. When performing the call connection to the called party, the routing decision entity in the network selects the access mode and instructs the routing execution entity to perform the call connection in the selected access mode with the corresponding access network type identity.

Further, when registering, the network side identifies the multiple registration events of the same terminal according to the acquired access network type identity so as to hold the plurality of registration connections of the same terminal, thereby solving the problem that the same terminal holds the plurality of registration connections at the IMS network, and the problem that after selecting the access mode, the routing decision entity correspondingly instructs the routing execution entity to perform the call connection in the selected access mode.

Figure 8:
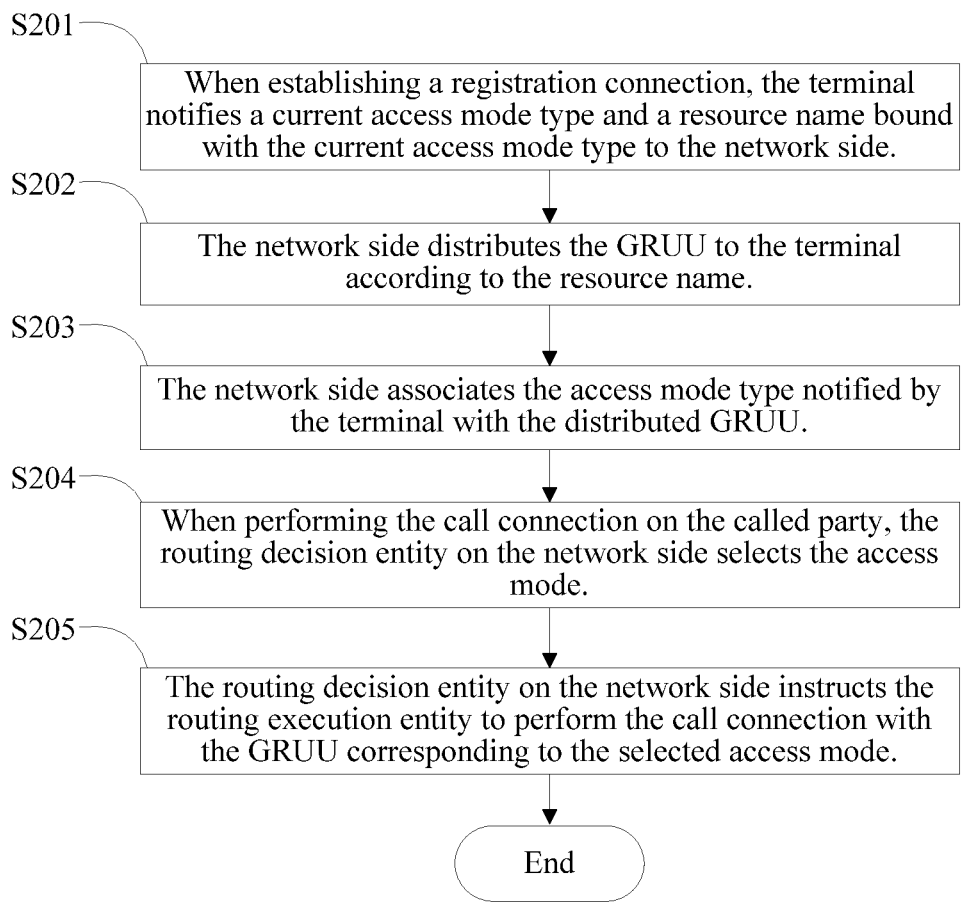
FIG. 8 is a flow chart of steps of a method according to a fifth embodiment of the present invention.

Referring to FIG. 8, the method according to a fifth embodiment of the present invention includes the steps as follows.

In Step S201, when establishing a registration connection, the terminal notifies a current access mode type and a resource name bound with the current access mode type to the network side.

In the existing systems, when being called, for the case that a plurality of terminals share the IMPU, the GRUU concept is introduced to the internet engineering task force (IETF) and the 3GPP in order to prevent the SIP REQUEST from being divided into a plurality of user equipments (UEs). The GRUU includes the resource names Instance_id of the IMPU and the UEs. The Instance_id is adapted to identify the ID of the UE Instance (that is, one terminal only has one Instance_id), and in this manner, the GRUU may identify one UE. Even if the IMPU is shared by multiple UEs, the GRUU serving as the REQUEST URI may still ensure that the SIP message is transmitted to the uniquely designated UE.

As the multimode terminal supporting various access modes is proposed, in the present invention, the different access mode types of the same multimode terminal are considered as the different application examples of the multimode terminal. The multimode terminal has a plurality of access network modules, so in the present invention, the different access modes of one multimode terminal respectively have the corresponding Instance_id, that is, the instance_id is bound with the access mode type.

The current access mode type may be carried in a P-Access-Network-Info header field of the registration message (the P-Access-Network-Info is a header field in the SIP protocol, and may be adapted to carry the access network information and the user position information) so as to be notified to the network side.

In Step S202, the network side distributes the GRUU to the terminal according to the resource name.

The GRUU includes the IMS public user identity IMPU and the instance_id notified by the terminal.

In Step S203, the network side associates the access mode type notified by the terminal with the distributed GRUU.

In Step S204, when performing the call connection to the called party, the routing decision entity on the network side selects the access mode.

The related policy of selecting the access mode by the routing decision entity includes at least one selected from among an operator policy, calling party preference information, access network capability, an access network status, a media class, a component in the media class, and attribute information of each component in the media class.

Before the routing decision entity selects the access mode, the method further includes the following steps: The routing decision entity judges whether or not at least two types of media components exist in a calling session message, and, if yes, the routing decision entity further selects whether or not to divide the calling session message into media streams according to the media components; (i.e., the routing decision entity may further select whether to divide each divided media stream into an uplink media stream and a downlink media stream), and, if still yes, the routing decision entity selects the access mode corresponding to each media stream, and instructs the routing execution entity to connect to the media stream using the GRUU corresponding to the selected access mode. If less than two types of media components exist in a calling session message, the routing decision entity directly selects the access mode of the calling session message, and instructs the routing execution entity to perform the call connection with the GRUU corresponding to the selected access mode.

In Step S205, the routing decision entity on the network side instructs the routing execution entity to perform the call connection with the GRUU corresponding to the selected access mode.

In detail, the routing decision entity carries the GRUU associated with the selected access mode type in the instruction message delivered to the routing execution entity. The routing execution entity locates the registration connection according to the GRUU carried in the instruction message, and performs the call connection based on the registration connection.

Figure 9:
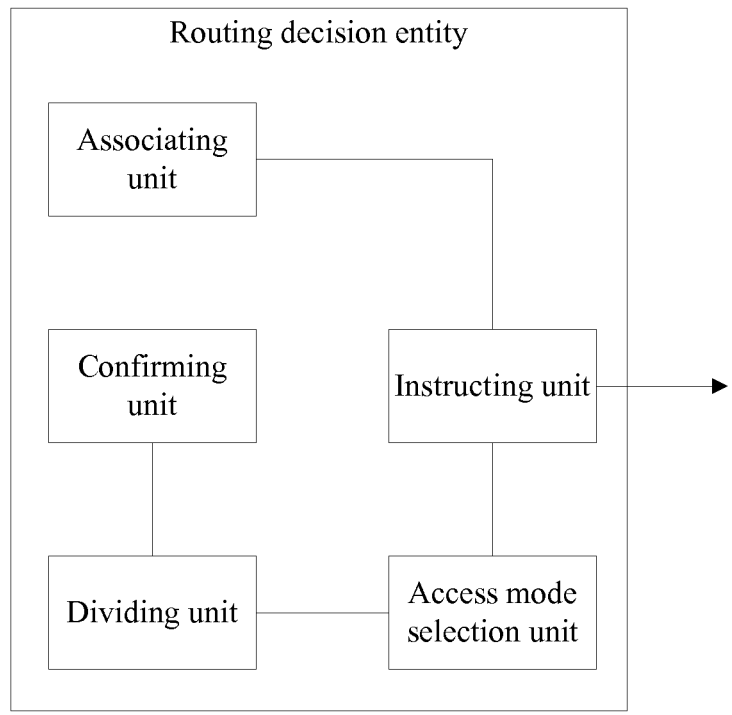
FIG. 9 is a schematic structural view of a routing decision entity according to an embodiment of the present invention.

Referring to FIG. 9, the present invention further provides a routing decision entity, which includes an associating unit, an access mode selection unit, and an instructing unit, and further includes a confirming unit and a dividing unit.

The associating unit is adapted to associate the access mode type notified by the multimode terminal with the GRUU distributed by the routing execution entity.

The confirming unit is adapted to transmit a trigger signal, when confirming that at least two types of media components exist in the received calling session message, and further confirming to divide the calling session message into the media streams according to the media components.

The dividing unit is adapted to divide the calling session message into the media streams according to the media components when receiving the trigger signal transmitted from the confirming unit, and notify the access mode selection unit to respectively select the access mode corresponding to each media stream.

The access mode selection unit is adapted to select the access mode.

The instructing unit is adapted to respectively acquire the GRUU corresponding to the access mode type selected by the access mode selection unit from the associating unit, and instruct the routing execution entity to perform the call connection with the GRUU.

Figure 10:
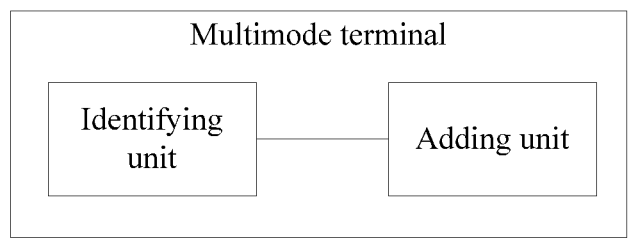
FIG. 10 is a schematic structural view of a multimode terminal according to an embodiment of the present invention.

Referring to FIG. 10, the present invention further provides a multimode terminal, which includes an identifying unit and an adding unit.

The identifying unit is adapted to identify the access mode type of the multimode terminal when establishing the registration connection.

The adding unit is adapted to add the current access mode type of the multimode terminal identified by the identifying unit and the resource name bound with the current access mode type to the registration message transmitted to the network side.

The system according to a second embodiment of the present invention includes a multimode terminal, a routing execution entity, and a routing decision entity.

The multimode terminal is adapted to notify the current access network type and the resource name bound with the current access mode type to the network side when establishing the registration connection.

The routing execution entity is adapted to serve as a registration server when the terminal establishes the registration connection, distribute a GRUU to the multimode terminal according to the resource name notified by the multimode terminal, and perform the call connection. The routing execution entity may be, for example, an S-CSCF.

The routing decision entity is adapted to associate the access mode type notified by the multimode terminal with the GRUU distributed to the multimode terminal by the routing execution entity according to the resource name, select the access mode, and instruct the routing execution entity to perform the call connection with the GRUU corresponding to the selected access mode type. Practically, the routing decision entity is a network element saving the related policy of selecting the access mode, for example, the AS or a home subscriber server (HSS).

The detailed description is given with two embodiments as follows.

Figure 11:
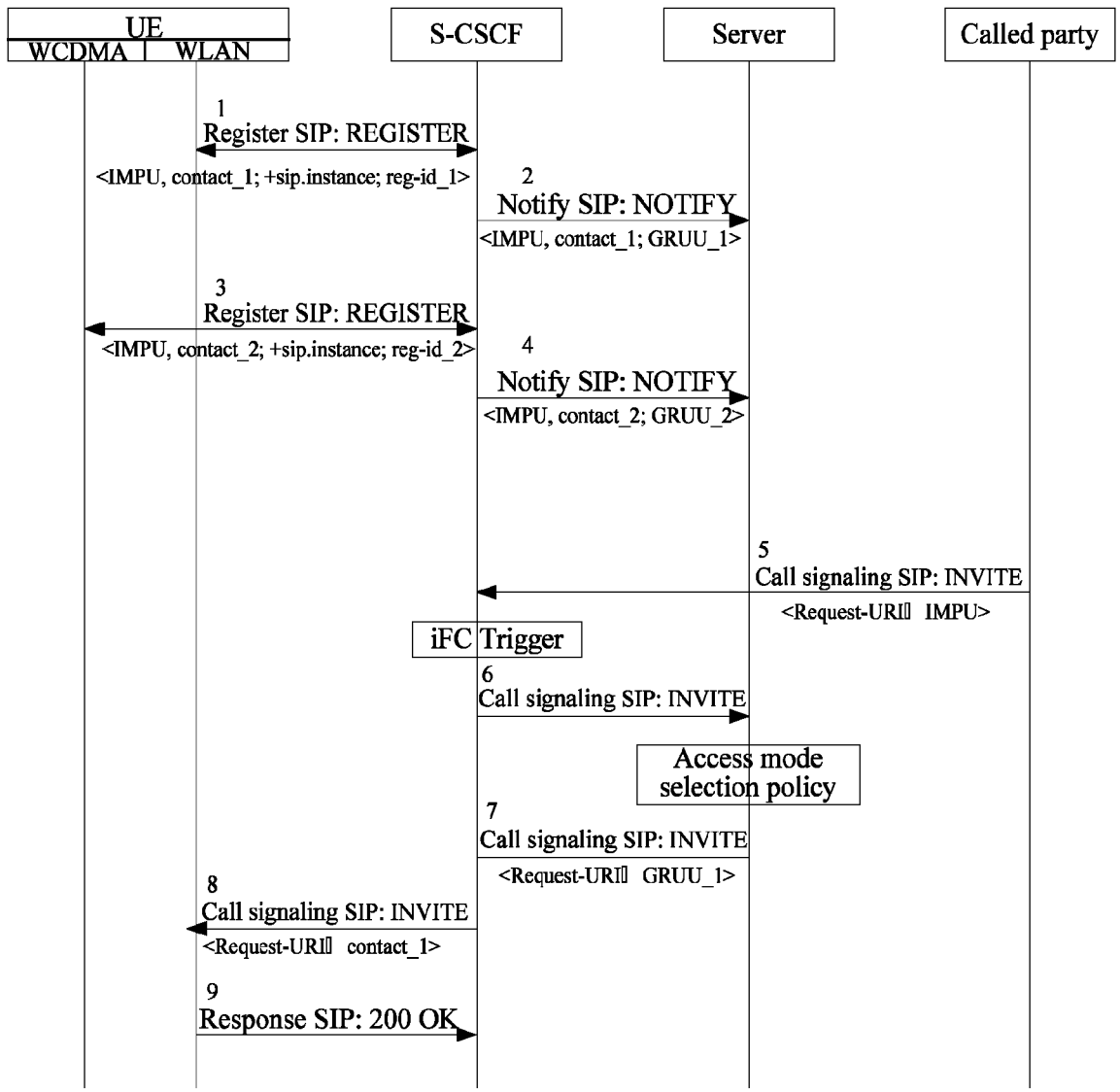
FIG. 11 is a flow chart of signaling of a method according to a sixth embodiment of the present invention.

In the method according to a sixth embodiment, when establishing the registration connection, the terminal notifies the current access mode type and the instance_id bound with the current access mode type to the network side. The network side associates the access mode type notified by the terminal with the distributed GRUU. The application server confirms that one type of media component exists in the calling session message, and it is not necessary to divide the media component. Then, when performing the call connection to the called party, the routing decision entity selects the access mode for the calling session message. Finally, the routing decision entity instructs the routing execution entity to perform the call connection with the GRUU corresponding to the selected access mode type. Referring to FIG. 11, the method includes the steps as follows.

In Step 1, the multimode terminal gets access to the IMS network from the WLAN and initiates a registration request REGISTER, a +sip.instance parameter is added to a contact header field of the registration request, and the content of the parameter is instance id_1 of the multimode terminal bound with the WLAN access mode. At the same time, the current access mode type information, that is, WLAN, is added to the P-Access-Network-Info header field of the registration request.

In Step 2, the S-CSCF generates GRUU_1 according to the IMPU and the value of the instance id_1 in the contact header field of the registration request, carries the user registration event and the GRUU_1 distributed to the terminal UE by the S-CSCF in the contact header field of the registration event notification message, and notifies the registration event notification message to the application server Server.

At the same time, the S-CSCF associates the contact_1 of the registration request with the GRUU_1 distributed to the terminal UE. After receiving the registration event notification message, the application server Server acquires from the registration event notification message that the multimode terminal gets access to the IMS network via the WLAN, and associates the WLAN access mode with the GRUU_1.

In Step 3, the multimode terminal gets access to the IMS network from the WCDMA and initiates another registration request, a +sip.instance parameter is added to the contact header field of the registration request, and the content of the parameter is instance id_2 of the multimode terminal bound with the WCDMA access mode. At the same time, the current access mode type information, that is, WCDMA, is added to the P-Access-Network-Info header field of the registration request.

[Note]: After receiving the registration message, the S-CSCF acquires that this is a multiple registration event of the same terminal according to the different reg-ids (the reg-id is carried in the contact header field of the registration request message, for the detailed content, please refer to the existing systems), and the original contact_1 connection (that is the contact established in Steps 1 and 2) is not deregistered.

Or, the S-CSCF judges that this is a multiple registration initiated from the different access modes of the same terminal according to the different instance IDs, so it is not necessary to adopt the reg-id.

In Step 4, the S-CSCF generates GRUU_2 according to the IMPU and the value of the instance id_2 in the contact header field of the registration request, carries the user registration event and the GRUU_2 distributed to the terminal UE by the S-CSCF in the contact header field of the registration event notification message, and notifies the registration event notification message to the application server Server.

At the same time, the S-CSCF associates the contact_2 of the registration request with the GRUU_2 distributed to the terminal UE. After receiving the registration event notification message, the application server Server acquires from the registration event notification message that the multimode terminal gets access to the IMS network from the WCDMA access, and associates the WCDMA access mode with the GRUU_2.

In Step 5, when an incoming call is required to be connected to the terminal device of the called user, the call message INVITE is firstly transmitted to the S-CSCF.

In Step 6, the S-CSCF triggers the INVITE to the application server Server with the iFC.

In Step 7, the application server Server decides the terminal device required to be connected to the call and the access mode (assumed to be WLAN) according to the related policy, and according to the association relation between the WLAN access mode and the GRUU_1, the Request-URI header field content of the INVITE is filled with GRUU_1, and the INVITE with the header field is returned to the S-CSCF.

In Step 8, the S-CSCF locates (selects) the registration connection of the GRUU_1 according to the selection of the application server Server and the association relation between the contact_1 and the GRUU_1 established in Steps 1 and 2, that is, the S-CSCF fills the Request-URI with the contact content (that is, the contact_1) established in Steps 1 and 2, and delivers the INVITE. In this manner, the call may be accurately terminated at the specific access mode of the specific multimode terminal device.

In Step 9, the multimode terminal receives the call under the WLAN mode, and returns the call final response.

Figure 12:
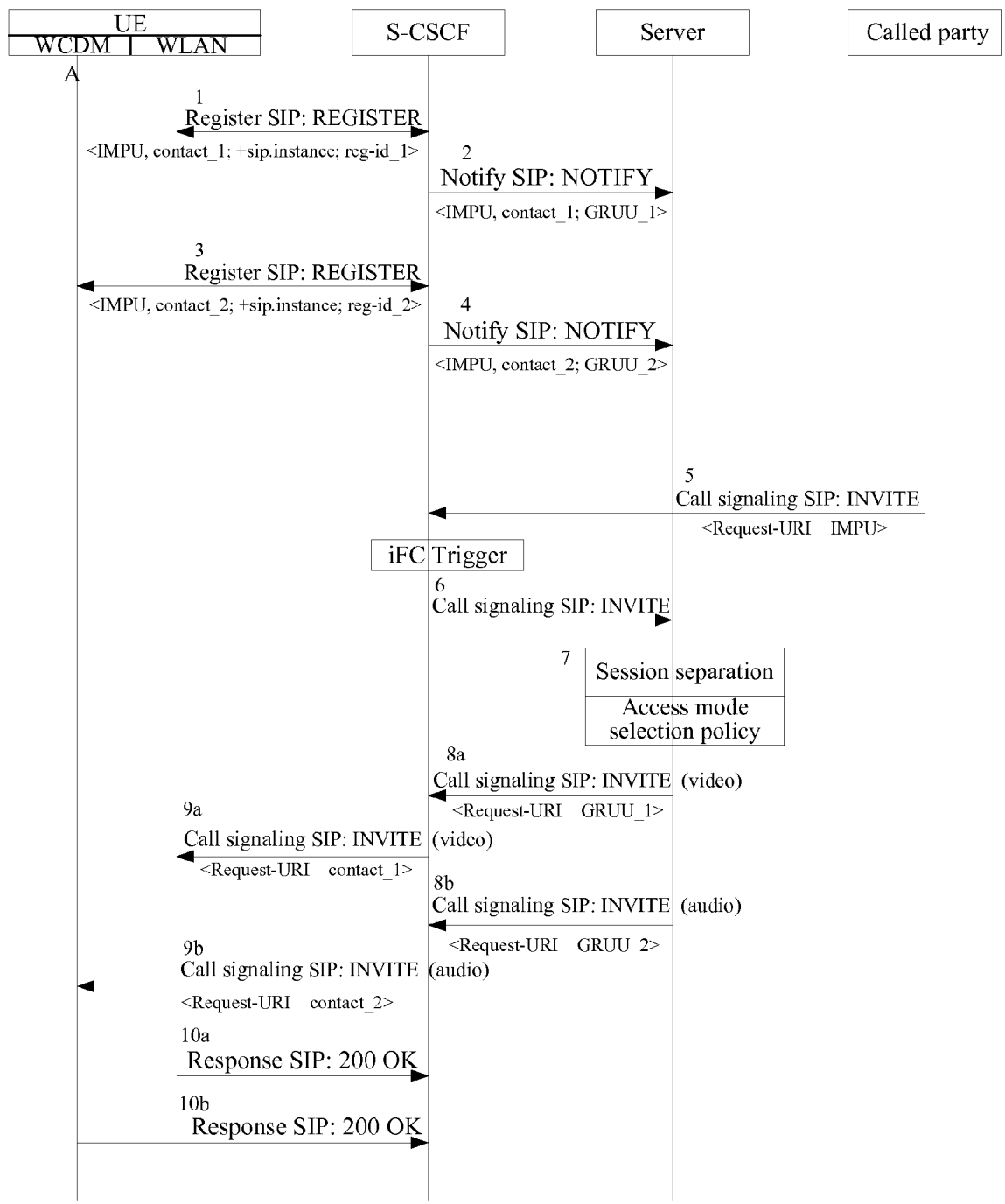
FIG. 12 is a flow chart of signaling of a method according to a seventh embodiment of the present invention.

In the method according to a seventh embodiment, when establishing the registration connection, the terminal notifies the current access mode type and the instance_id bound with the current access mode type to the network side. The network side associates the access mode type notified by the terminal with the distributed GRUU. The application server confirms that a plurality of types of media components exists in the calling session message, and divides the session message according to the media components based on a certain policy. Then, when performing the call connection to the called party, the routing decision entity respectively selects the access mode for each divided media stream. Finally, the routing decision entity instructs the routing execution entity to be connected to the media stream with the GRUU corresponding to the selected access mode. Referring to FIG. 12, the method includes the steps as follows.

In Step 1, the multimode terminal gets access to the IMS network from the WLAN and initiates a registration request REGISTER, a +sip.instance parameter is added to a contact header field of the registration request, and the content of the parameter is instance id_1 of the multimode terminal bound with the WLAN access mode. At the same time, the current access mode type information, that is, WLAN, is added to the P-Access-Network-Info header field of the registration request.

In Step 2, the S-CSCF generates GRUU_1 according to the IMPU and the value of the instance id_1 in the contact header field of the registration request, carries the user registration event and the GRUU_1 distributed to the terminal UE by the S-CSCF in the contact header field of the registration event notification message, and notifies the registration event notification message to the application server Server.

At the same time, the S-CSCF associates the contact_1 of the registration request with the GRUU_1 distributed to the terminal UE. After receiving the registration event notification message, the application server Server acquires from the registration event notification message that the multimode terminal gets access to the IMS network from the WLAN access, and associates the WLAN access mode with the GRUU_1.

In Step 3, the multimode terminal gets access to the IMS network from the WCDMA and initiates another registration request, a +sip.instance parameter is added to the contact header field of the registration request, and the content of the parameter is instance id_2 of the multimode terminal bound with the WCDMA access mode. At the same time, the current access mode type information, that is, WCDMA, is added to the P-Access-Network-Info header field of the registration request.

[Note]: After receiving the registration message, the S-CSCF acquires that this is a multiple registration event of the same terminal according to the different reg-ids (the reg-id is carried in the contact header field of the registration request message, for the detailed content, please refer to the existing systems), and the original contact_1 connection (that is the contact established in Steps 1 and 2) is not deregistered.

Or, the S-CSCF judges that this is a multiple registration initiated from the different access modes of the same terminal according to the different instance ids, so it is not necessary to adopt the reg-id.

In Step 4, the S-CSCF generates GRUU_2 according to the IMPU and the value of the instance id_2 in the contact header field of the registration request, carries the user registration event and the GRUU_2 distributed to the terminal UE by the S-CSCF in the contact header field of the registration event notification message, and notifies the registration event notification message to the application server Server.

At the same time, the S-CSCF associates the contact_2 of the registration request with the GRUU_2 distributed to the terminal UE. After receiving the registration event notification message, the application server Server acquires from the registration event notification message that the multimode terminal gets access to the IMS network from the WCDMA access, and associates the WCDMA access mode with the GRUU_2.

In Step 5, when an incoming call is required to be connected to the terminal device of the called user, the call message INVITE is firstly transmitted to the S-CSCF.

In Step 6, the S-CSCF triggers the INVITE to the application server Server with the iFC.

In Step 7, the application server Server judges that a plurality of types of media components exists in the calling session message, and divides the session message in term of the different media components according to the certain policy. The application server Server selects the terminal device and the access mode for each divided media stream according to the policy. In this embodiment, video and audio media streams are divided, it is decided that the video stream is connected to the multimode terminal in the WLAN mode, and the audio flow is connected to the multimode terminal in the WCDMA mode.

[Note]: the media stream may be further divided into the uplink and the downlink media streams.

In Step 8a, it is decided that the video stream is connected to the multimode terminal in the WLAN mode, according to the association relation between the WLAN access mode and the GRUU_1, the Request-URI header field content of the INVITE is filled with the GRUU_1, and the INVITE with the header field is returned to the S-CSCF. The process proceeds to Step 9a.

In Step 8b, at the same time (with Step 8a), it is decided that the audio flow is connected to the multimode terminal in the WCDMA mode, according to the association relation between the WCDMA access mode and the GRUU_2, the Request-URI header field content of the INVITE is filled with the GRUU_2, and the INVITE with the header field is returned to the S-CSCF. The process proceeds to Step 9b.

In Step 9a, the S-CSCF locates (selects) the registration connection of the GRUU_1 according to the selection of the application server Server and the association relation between the contact_1 and the GRUU_1 established in Steps 1 and 2, that is, the S-CSCF fills the Request-URI with the contact content (that is, the contact_1) established in Steps 1 and 2, and delivers the INVITE. In this manner, the video media stream may be accurately terminated at the WLAN access mode of the specific multimode terminal device. The process proceeds to Step 10a.

In Step 9b, at the same time (with Step 9a), the S-CSCF locates (selects) the registration connection of the GRUU_2 according to the selection of the application server Server and the association relation between the contact_2 and the GRUU_2 established in Steps 3 and 4, that is, the S-CSCF fills the Request-URI with the contact content (that is, the contact_2) established in Steps 3 and 4, and delivers the INVITE. In this manner, the audio media stream may be accurately terminated at the WCDMA access mode of the specific multimode terminal device. The process proceeds to Step 10b.

In Step 10a, the multimode terminal receives the video media stream under the WLAN mode, and returns the call final response.

In Step 10b, the multimode terminal receives the audio media stream under the WCDMA mode, and returns the call final response.

In the method according to the sixth and the seventh embodiments, when establishing the registration connection, the terminal notifies the current access mode type and the instance_id bound with the current access mode type to the network side. The network side associates the access mode type notified by the terminal with the GRUU distributed to the terminal according to the instance_id. Then, when performing the call connection to the called party, the routing decision entity respectively selects the access mode and instructs the routing execution entity to perform the call connection with the GRUU corresponding to the selected access mode. Therefore, with the series of operations, for example, binding the instance_id with the current access mode type, distributing the GRUU according to the instance_id, and associating the current access mode type with the GRUU, after selecting the access mode according to the certain policy, the routing decision entity may instruct the routing execution entity to perform the call connection in the selected access mode.

Before the routing decision entity selects the access mode, the method further includes the following steps: the routing decision entity judges whether at least two types of media components exist in the calling session message or not, and, if yes, the routing decision entity further selects whether to divide the calling session message into the media streams according to the media components or not, if yes, the routing decision entity respectively selects the access mode corresponding to each media stream, and respectively instructs the routing execution entity to be connected to the media stream with the GRUU corresponding to the selected access mode. Otherwise, the routing decision entity directly selects the access mode of the calling session message, and instructs the routing execution entity to perform the call connection with the GRUU corresponding to the selected access mode. In this manner, the media stream is connected with the most appropriate access network, thereby improving the network transferring efficiency, and improving the user service experience.

Further, when judging to divide the calling session message into the media streams according to the media components, the routing decision entity divides each divided media stream into the uplink media stream and the downlink media stream so as to well utilize various access networks, and improve the user service experience.

The method according to an eighth embodiment includes the steps as follows: (1) when establishing the registration connection, the terminal notifies the identification information of the current access mode type to the network side; then, (2) when performing the call connection to the called party, the routing decision entity on the network side divides the calling session message into the media streams according to the media components (may further divide each media component into the uplink media stream and the downlink media stream), respectively selects the access mode corresponding to each media stream, and respectively instructs the routing execution entity to be connected to the media stream with the identification information corresponding to the selected access mode.

The identification information of the access network type is the current access mode type and the resource name instance_id bound with the current access mode type, or the content (for example, the name is accesstype, and the value may be "wlan" or "wcdma" etc.) carried in the added parameter in the feature tag.

Further, in the present invention, the division may be directly performed without judging the number of the media components in the calling session message. Alternatively, when it is confirmed that at least two media components exist in the calling session message, the calling session message is divided into the media streams according to the media components.

Figure 13:
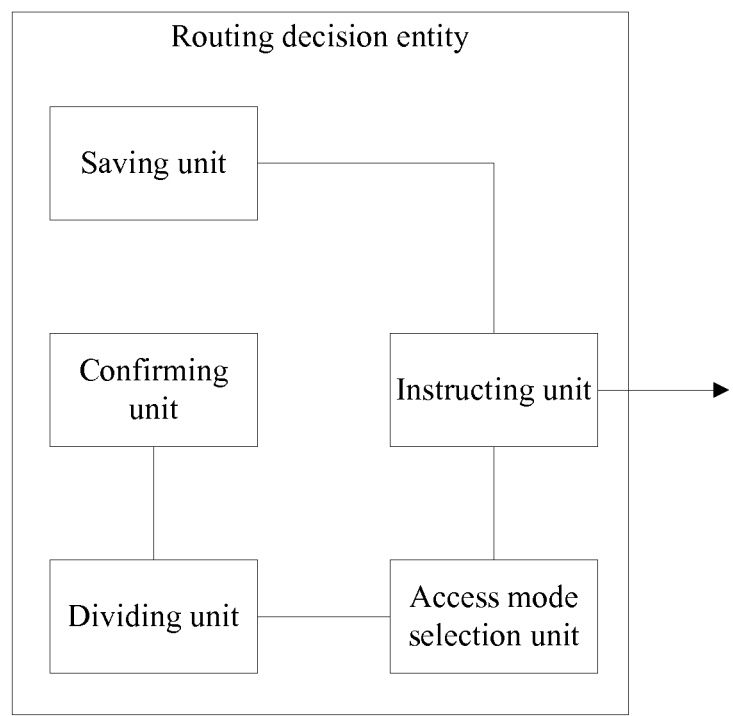
FIG. 13 is a schematic structural view of another routing decision entity according to an embodiment of the present invention.

Referring to FIG. 13, the present invention further provides a routing decision entity, which includes a saving unit, a dividing unit, an access mode selection unit, and an instructing unit, and may further include a confirming unit.

The saving unit is adapted to save the identification information of the current access network type notified by the terminal when establishing the registration connection.

The confirming unit is adapted to transmit the trigger signal to the dividing unit when confirming that at least two types of the media components exist in the calling session message.

The dividing unit is adapted to divide the calling session message into the media streams according to the media components and transmit a divided result. The dividing unit may wait for the judging unit to transmit the trigger signal and perform the division operation, and may also directly perform the division operation.

The access mode selection unit is adapted to respectively select the access mode corresponding to each media stream according to the divided result transmitted from the dividing unit.

The instructing unit is adapted to respectively acquire the identification information corresponding to the access mode type selected by the access mode selection unit for each media stream from the saving unit, and instruct the routing execution entity to be connected to the media stream with the identification information.

The detailed description is given below with reference to two embodiments as follows.

In the method according to a ninth embodiment, the application server judges that the plurality of media components exists in the calling session message, and decides to divide the session message according to the media components based on the certain policy.

In this embodiment, a feature tag is added to identify the access network type, it is assumed that the name of the added feature tag is accesstype, and the value is "wlan" or "wcdma" etc., for identifying the various different access modes.

Figure 14:
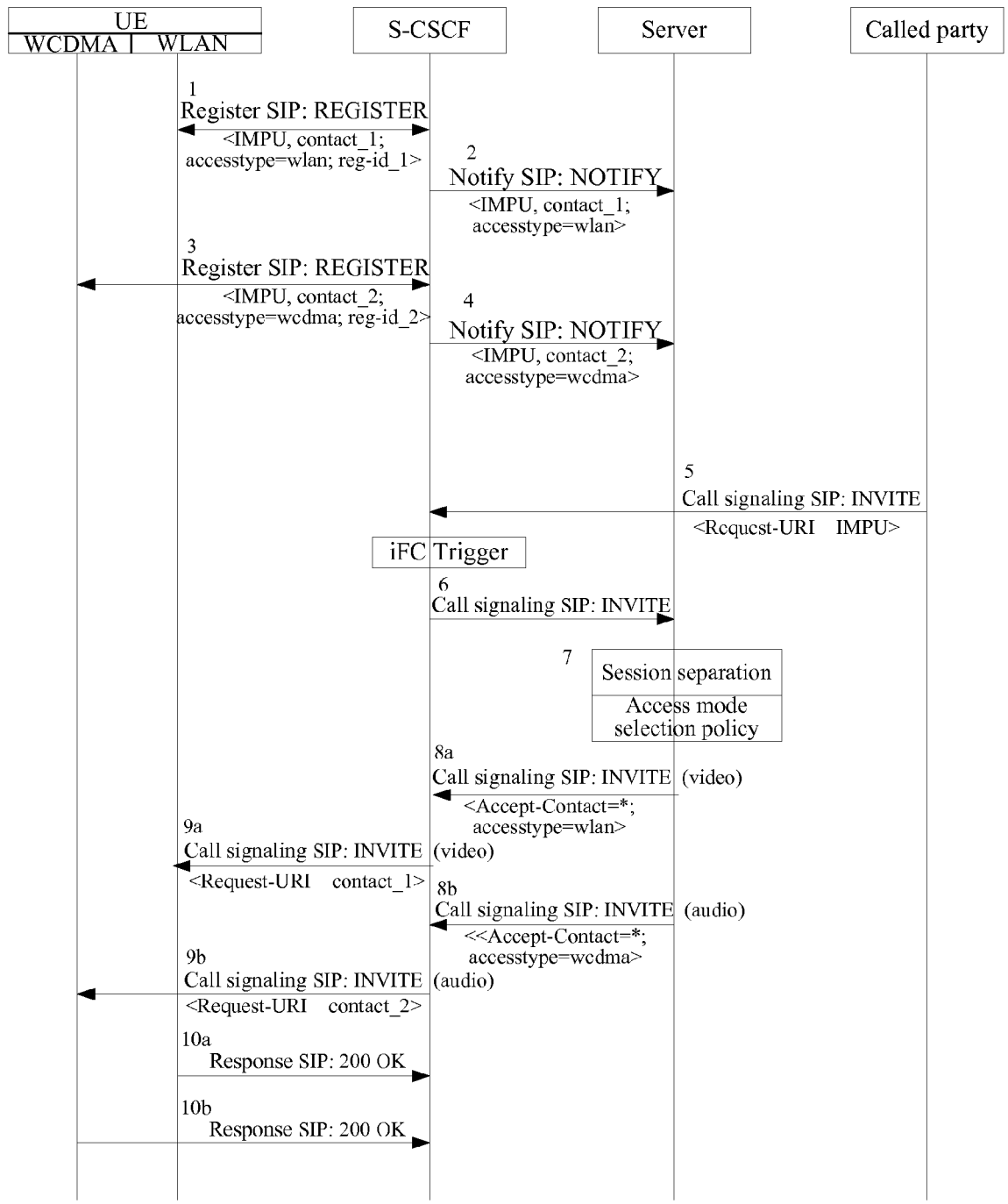
FIG. 14 is a flow chart of signaling of a method according to a ninth embodiment of the present invention.

Referring to FIG. 14, the method includes the steps as follows.

In Step 1, the multimode terminal gets access to the IMS network from the WLAN and initiates a registration request REGISTER, a contact-1 address is carried in the request message, the accesstype parameter identifying the access network type is carried after the contact header field, the value of the parameter is wlan, representing that the multimode terminal gets access to the IMS network from the WLAN network. After being forwarded with the corresponding entity, the request message reaches the S-CSCF (the process is irrelevant to the present invention, so it is omitted here).

In Step 2, after finishing the user registration flow, the S-CSCF notifies the user registration event and the contact header field content to the application server Server, and the contact header field content includes the accesstype parameter identifying the access network type, and the value is wlan (the server has subscribed the user registration event from the S-CSCF before, so here the S-CSCF may notify the server, and the subscription process is irrelevant to the present invention, so it is omitted here).

In Step 3, the multimode terminal gets access to the IMS network from the WCDMA and initiates another registration request, the contact_2 address and the accesstype parameter with the value being wcdma are carried in the request message, representing that the multimode terminal gets access to the IMS network from the WCDMA network.

[Note]: After receiving the registration message, the S-CSCF acquires that this is a multiple registration event of the same terminal according to the different reg-ids (the reg-id is carried in the contact header field of the registration request message), and the original contact_1 connection is not deregistered.

In addition, as an added method, the S-CSCF judges that this is a multiple registration initiated from the different access modes of the same terminal according to the different accesstype.

In Step 4, the S-CSCF also notifies the new registration event of the user and the contact header field content to the application server Server, and the contact header field content includes the accesstype parameter identifying the access network type, and the value is wcdma.

In Step 5, when one call is required to be connected to the user, the call signaling INVITE is firstly transmitted to the S-CSCF.

In Step 6, the S-CSCF triggers the call signaling to the application server Server with the iFC.

In Step 7, the application server Server judges that a plurality of types of media components exists in the calling session message, and divides the session message according to the different media components based on the certain policy. The application server Server selects the terminal device and the access mode for each divided media stream according to the policy. In this embodiment, video and audio media streams are divided, it is decided that the video stream is connected to the multimode terminal in the WLAN mode, and the audio flow is connected to the multimode terminal in the WCDMA mode.

[Note]: the media stream may be further divided into the uplink and the downlink media streams.

In Step 8a, it is decided that the video stream is connected to the multimode terminal in the WLAN mode, the Accept-Contact header field content is filled with accesstype=wlan, and the INVITE with the header field is returned to the S-CSCF.

In Step 8b, at the same time, it is decided that the audio flow is connected to the multimode terminal in the WCDMA mod, the Accept-Contact header field content is filled with accesstype=wcdma, and the INVITE with the header field is returned to the S-CSCF.

In Step 9a, the S-CSCF locates (selects) the registration connection of accesstype=wlan according to the selection of the application server Server, that is, the S-CSCF fills the Request-URI with the contact_1 content, and delivers the INVITE. In this manner, the video media stream may be accurately terminated at the WLAN access mode of the specific multimode terminal device.

In Step 9b, the S-CSCF locates (selects) the registration connection of accesstype=wcdma according to the selection of the application server Server, that is, the S-CSCF fills the Request-URI with the contact_2 content, and delivers the INVITE. In this manner, the audio media stream may be accurately terminated at the WCDMA access mode of the specific multimode terminal device.

In Step 10a, the multimode terminal receives the video media stream under the WLAN mode, and returns the call final response.

In Step 10b, the multimode terminal receives the audio media stream under the WCDMA mode, and returns the call final response.

In the method according to a tenth embodiment, when establishing the registration connection, the terminal notifies the current access mode type and the instance_id bound with the current access mode type to the network side. The network side associates the access mode type notified by the terminal with the distributed GRUU. The application server confirms that a plurality of types of media components exists in the calling session message, and divides the session message according to the media components based on the certain policy. Then, when performing the call connection to the called party, the routing decision entity respectively selects the access mode for each divided media stream. Finally, the routing decision entity instructs the routing execution entity to be connected to the media stream with the GRUU corresponding to the selected access mode.

To sum up, the method according to the ninth and the tenth embodiments of the present invention, when establishing the registration connection, the terminal notifies the identification information of the current access network type to the network side. When performing the call connection to the called party, the routing decision entity on the network side divides the calling session message into the media streams according to the media components, respectively selects the access mode corresponding to each media stream according to the related policy, and respectively instructs the routing execution entity to be connected to the media stream with the identification information corresponding to the selected access mode. In this manner, the media stream is connected with the most appropriate access network, thereby improving the network transferring efficiency, and improving the user service experience.

Further, when judging that it is necessary to divide the calling session message into the media streams according to the media components, the routing decision entity divides each divided media stream into the uplink media stream and the downlink media stream so as to well utilize the various access networks, and improve the user service experience.

It will be apparent to those skilled in the art that various modifications and variations can be made to the present invention without departing from the scope or spirit of the invention. For example, in addition to being applied to the multimode terminal of the WCDMA in the embodiments, the present invention may also be applied to the multimode terminal of the CDMA2000 and the mobile multimode terminals of other standards. In view of the foregoing, it is intended that the present invention cover modifications and variations of this invention provided that they fall within the scope of the following claims and their equivalents.

What is claimed is:

1. A method for providing an access network selection to a multimode terminal, comprising:
obtaining, by a routing decision entity in an internet protocol (IP) multimedia sub-system (IMS), a plurality of access network type identities sent by the multimode terminal when the multimode terminal registers to the IMS through a plurality of access networks corresponding to the plurality of access network type identities, wherein each of the plurality of access network type identities sent by the multimode terminal is carried in a contact header filed in a registration message;
receiving, by the routing decision entity, an INVITE message which is sent by a Serving Call Session Control Function (S-CSCF) in the IMS;
after receiving the INVITE message, creating, by the routing decision entity, an INVITE message in which an Accept-Contact header field carries one of the plurality of the access network type identities; and
sending, by the routing decision entity, the created INVITE message to the S-CSCF so that the S-CSCF communicates with the multimode terminal through an access network corresponding to the access network type identity carried in the Accept-Contact header field.

2. A routing decision entity in an internet protocol (IP) multimedia sub-system (IMS), comprising:
a receiver configured to obtain a plurality of access network type identities sent by a multimode terminal when the multimode terminal registers to the IMS through a plurality of access networks corresponding to the plurality of access network type identities, wherein each of the plurality of access network type identities sent by the multimode terminal is carried in a contact header filed in a registration message; receive an INVITE message which is sent by a Serving Call Session Control Function (S-CSCF) in the IMS; and create an INVITE message in which an Accept-Contact header field carries one of the plurality of the access network type identities; and
a transmitter configured to send the created INVITE message to the S-CSCF so that the S-CSCF communicates with the multimode terminal through an access network corresponding to the access network type identity carried in the Accept-Contact header field.

3. A system for providing an access network selection to a multimode terminal, comprising:
a routing decision entity, configured to obtain a plurality of access network type identities sent by the multimode terminal when the multimode terminal registers to the IMS through a plurality of access networks corresponding to the plurality of access network type identities, wherein each of the plurality of access network type identities sent by the multimode terminal is carried in a contact header filed in a registration message; receive an INVITE message which is sent by a Serving Call Session Control Function (S-CSCF) in the IMS; create, after receiving the INVITE message, an INVITE message in which an Accept-Contact header field carries one of the plurality of the access network type identities; and send the created INVITE message to the S-CSCF so that the S-CSCF communicates with the multimode terminal through an access network corresponding to the access network type identity carried in the Accept-Contact header field; and the S-CSCF, configured to communicate with the multimode terminal through the access network corresponding to the access network type identity carried in the Accept-Contact header field.

* * * * *